April 7, 1925.

L. JAMES 1,532,494

AUTOMOBILE CLUTCH CONTROL

Filed April 19, 1924

INVENTOR.
Leslie James,
BY Milo B. Stevens Co.
ATTORNEYS.

Patented Apr. 7, 1925.

1,532,494

UNITED STATES PATENT OFFICE.

LESLIE JAMES, OF CHICAGO, ILLINOIS.

AUTOMOBILE CLUTCH CONTROL.

Application filed April 19, 1924. Serial No. 707,749.

*To all whom it may concern:*

Be it known that I, LESLIE JAMES, a citizen of the United States, residing at Chicago, in the county of Cook and State of Illinois, have invented new and useful Improvements in Automobile Clutch Controls, of which the following is a specification.

This invention relates to clutch controlling devices especially adapted for use on Ford automobiles.

Briefly stated an important object of this invention is to provide a novel means whereby the depression of the brake pedal on a Ford automobile will result in the movement of the clutch pedal to a neutral position so that it will not be necessary to separately move the clutch pedal to its neutral position.

A further object is to provide a clutch pedal controlled device which will permit the brake pedal to be depressed to its fullest extent without a corresponding depression of the clutch pedal.

Also an important aim of this invention is to provide a clutch pedal controlled device which will permit of the depression of the clutch pedal at any time and without the corresponding depression of the brake pedal.

A further object is to provide a control device which may be conveniently applied to an automobile either during the course of manufacture or at any time thereafter without marring the appearance of the vehicle and without the exercise of unusual skill.

Other objects and advantages will be apparent during the course of the following description.

In the accompanying drawing forming a part of this application and in which like numerals are employed to designate like parts throughout the same, Figure 1 is a vertical section view through the improved control mechanism applied;

Figure 1:
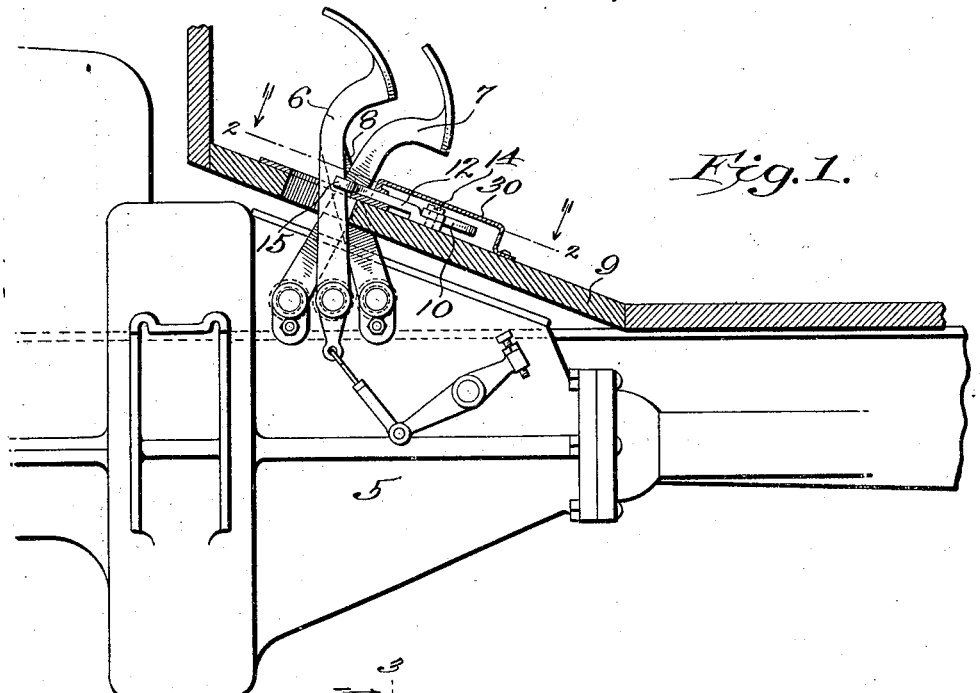

In the drawing wherein for the purpose of illustration is shown a preferred embodiment of the invention, the numeral 5 designates a planetary transmission with which clutch, reverse and brake pedals 6, 7 and 8 respectively are associated in the usual and well known manner.

The pedals extend up through the floor boards 9 and are, of course, adapted to be depressed by the operator for controlling the transmission and for bringing the vehicle to a halt.

Figure 2:
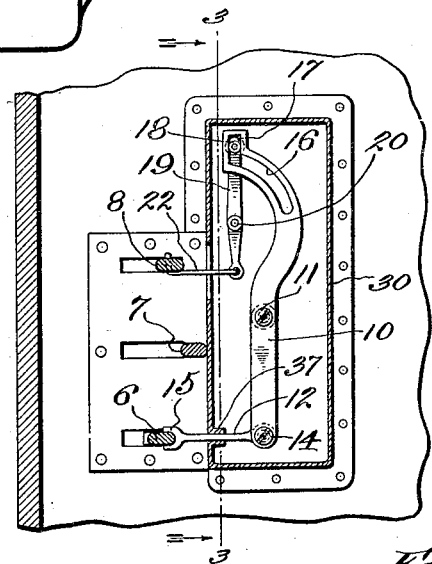
Fig. 2 is a horizontal sectional view taken on line 2—2 of Fig. 1.
Figure 3:
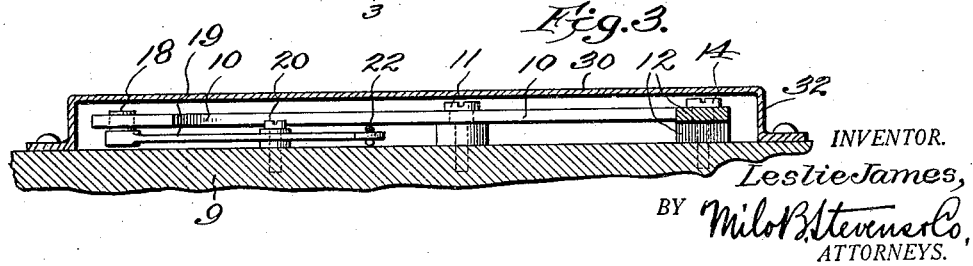
Fig. 3 is a longitudinal sectional view taken on line 3—3 of Fig. 2.

The invention forming the subject matter of this application resides in providing simple and reliable means whereby the depression of the pedal 8 will result in the movement of the clutch pedal 6 to a neutral position so that it is necessary to depress only one pedal when it is desired to bring the vehicle to a halt. Fig. 2 illustrates that a lever 10 is connected intermediate its ends as indicated at 11 to a suitable support such as the floor board and is provided at one end with a link 12.

The link 12 is pivotally connected as indicated at 14 to the lever 10 and may be provided with a bifurcated forward end 15 for engagement with the pedal 6 so as to swing the pedal to a neutral position.

It is thus seen that the movement of the lever 10 in a clockwise direction will result in the advancement of the pedal 6. That end of the lever 10 which is adjacent the brake pedal 8 is curved longitudinally and is provided with an arcuate slot 16 having a longitudinal branch 17 for the reception of a bearing member or pin 18 on one end of a lever 19. The lever 19 is connected intermediate the ends thereof as indicated at 20 to a suitable support such as the floor boards and a link 22 extends from the lever 19 to the pedal 8 so that when the pedal 8 is depressed the bearing pin 18 will engage one side wall of the slot 16 and thereby swing the lever on its fulcrum 11. However the continued depression of the pedal 8 will result in the movement of the pin 18 into the branch 17 and further swinging movement of the lever 10 will be stopped. When the pin 18 is moved into the slot 16 it will bear against one side wall of the slot and thereby hold the lever 10 in set or operative position. That is to say when the pin or bearing member 18 moves out of the longitudinal branch of the slot 16 the lever 10 will not be permitted to instantly return to its inoperative position and thereby allow the clutch pedal to return to its retracted position. It is believed to be obvious that when the brake pedal 8 is depressed by the operator the link 22 is drawn forwardly for swinging the lever 19 on its fulcrum 20 whereupon the lever 10 is turned a limited extent so its connection with the lever 19 by the bearing member 18. As the pedal 8 continues its movement to advanced position the bearing member 18 will move into the slot 16 thereby holding the lever in a set position. When the clutch pedal 6 is moved to its intermediate position the transmission is in neutral. However the use of this device does not prevent the separate actuation of the pedal and the movement to its extreme forward position for operation of the transmission in low gear.

In carrying out the invention a suitable housing 30 may extend over the levers and associated mechanism to prevent the carpet from becoming entangled in the mechanism and to exclude dirt. The housing 30 is provided with side walls 32 the rear wall being apertured for the reception of links 12 and 22. It will be seen with reference to Fig. 2 that the front wall 32 of the housing is formed with boss 37 which guides the link 12 and thereby holds the forward end of the same in position to properly engage the pedal 6.

A control device constructed in accordance with this invention may be economically manufactured and conveniently applied to a motor vehicle without interfering with the operation of the vehicle or marring the appearance of the same.

Having thus described the invention, what is claimed is:

1. A control mechanism for use on planetary transmissions of automobiles comprising a lever having an arcuate slot and a branch communicating with the slot, a lever fulcrumed intermediate its ends and having a bearing member normally received in said branch, and a link connected to said second named lever and adapted for connection with the brake pedal of a planetary transmission whereby the depression of the brake pedal swings the second named lever to position said bearing member in the arcuate slot and thereby move the first named lever a limited extent.

2. A control mechanism for use on planetary transmissions of automobiles comprising a lever having one end formed with an arcuate slot and a branch communicating with the slot, a lever fulcrumed intermediate its ends and having a bearing member normally received in said branch, a link connected to said second named lever and adapted for connection with the brake pedal of a planetary transmission whereby the depression of the brake pedal swings the second named lever to position said bearing member in the arcuate slot and thereby move the first named lever a limited extent, and a link connection to one end of said first named lever and adapted for engaging the clutch pedal of a transmission.

3. A control mechanism for use on planetary transmissions of automobiles comprising a lever having one end formed with an arcuate slot and a branch communicating with the slot, a lever fulcrumed intermediate its ends and having a bearing member normally received in said branch, a link connected to said second named lever and adapted for connection with the brake pedal of a planetary transmission whereby the depression of the brake pedal swings the second named lever to position said bearing member in the arcuate slot and thereby move the first named lever a limited extent, and a link connection to one end of said first named lever and adapted for engaging the clutch pedal of a transmission, and a housing receiving said first and second named levers and having means to guide said second named link.

4. A control attachment for planetary transmissions of automobiles comprising a link adapted for connection with the brake pedal of a transmission, a lever connected to said link and having one end provided with a bearing member, a main lever having one end curved longitudinally and formed with an arcuate slot having a straight branch receiving the bearing member of said first named lever, a link pivoted to the said lever and adapted to contact with the clutch pedal of a transmission, and a housing receiving said first and second named levers and having means to guide said second named link, the bearing member of said first named lever being adapted to be received in said arcuate slot and engage one wall of the same to hold said second named lever in set position.

In testimony whereof I affix my signature.

LESLIE JAMES.